United States Patent
Oohashi et al.

(10) Patent No.: US 8,498,813 B2
(45) Date of Patent: Jul. 30, 2013

(54) NAVIGATION DEVICE, METHOD, AND PROGRAM

(75) Inventors: Yusuke Oohashi, Sapporo (JP); Daisuke Sakaki, Sapporo (JP); Yohei Ando, Kasugai (JP)

(73) Assignee: Aisin AW Co., Ltd., Anjo (JP)

( * ) Notice: Subject to any disclaimer, the term of this patent is extended or adjusted under 35 U.S.C. 154(b) by 682 days.

(21) Appl. No.: 12/656,943

(22) Filed: Feb. 19, 2010

(65) Prior Publication Data
US 2010/0217524 A1  Aug. 26, 2010

(30) Foreign Application Priority Data
Feb. 26, 2009 (JP) ................................ 2009-043791

(51) Int. Cl.
*G01C 21/00* (2006.01)
*G01C 21/26* (2006.01)
*G01C 21/28* (2006.01)
*G01C 21/30* (2006.01)

(52) U.S. Cl.
USPC ........... 701/447; 701/409; 701/445; 701/446; 701/469; 701/472

(58) Field of Classification Search
USPC ................. 701/216, 445–447, 449, 454, 466, 701/468–469, 472–473, 475, 478.5, 495, 701/498, 500–501, 505, 518, 521, 525, 527, 701/530, 534
See application file for complete search history.

(56) References Cited

U.S. PATENT DOCUMENTS

| | | | | |
|---|---|---|---|---|
| 6,023,653 | A * | 2/2000 | Ichimura et al. | 701/446 |
| 7,962,282 | B2 * | 6/2011 | Fujita et al. | 701/446 |
| 8,032,299 | B2 * | 10/2011 | Fernandez Hernandez et al. | 701/436 |
| 8,180,566 | B2 * | 5/2012 | Kobayashi | 701/411 |
| 2009/0287410 | A1 * | 11/2009 | Kobayashi | 701/209 |

FOREIGN PATENT DOCUMENTS
JP     A-2006-284499     10/2006

* cited by examiner

*Primary Examiner* — Khoi Tran
*Assistant Examiner* — Dale Moyer
(74) *Attorney, Agent, or Firm* — Oliff & Berridge, PLC

(57) ABSTRACT

Devices, methods, and programs identify a leading candidate point by calculating a cost for candidate points on a road, and match a vehicle position to the identified leading candidate point. The devices, methods, and programs acquire an estimated vehicle position based on dead reckoning navigation, acquire a GPS position of the vehicle, and set the candidate points for the vehicle position on nearby roads. The devices, methods, and programs calculate for each candidate point a normal cost of the candidate point with respect to the estimated position and a correction cost that corresponds to a value L1 (the value L1 being found by subtracting a width W of a road having the candidate point from a distance d between the GPS position and the candidate point), and identify the leading candidate point based on a total cost of the normal cost and the correction cost for each candidate point.

15 Claims, 12 Drawing Sheets

FIG. 2A

| RELIABILITY | HEADING | DISTANCE |
|---|---|---|
| 5 | WITHIN APPROX. 1 DEG [°] | WITHIN APPROX. 5 [m] |
| 4 | WITHIN APPROX. 3 DEG [°] | WITHIN APPROX. 10 [m] |
| 3 | WITHIN APPROX. 10 DEG [°] | WITHIN APPROX. 25 [m] |
| 2 | WITHIN APPROX. 45 DEG [°] | WITHIN APPROX. 50 [m] |
| 1 | UNKNOWN | UNKNOWN |

FIG. 2B

| NO. | ITEM | ESTIMATED RELIABILITY | | GPS RELIABILITY | |
|---|---|---|---|---|---|
| | | HEADING | DISTANCE | HEADING | DISTANCE |
| 1 | PREVIOUS RELIABILITY | ○ | ○ | | |
| 2 | SPECULATIVE CUMULATIVE HEADING ERROR | ○ | | | |
| 3 | GYRO SENSITIVITY LEARNING CONDITION | ○ | | | |
| 4 | ESTIMATED HEADING RELIABILITY | | ○ | | |
| 5 | DISTANCE COEFFICIENT LEARNING CONDITION | | ○ | | |
| 6 | GPS/ESTIMATED PATH HEADING COINCIDENCE | | | ○ | |
| 7 | SPEED | | | ○ | |
| 8 | HDOP | | | ○ | ○ |
| 9 | GPS/ESTIMATED PATH LOCATION COINCIDENCE BASED ON INTER-COORDINATE DISTANCES | | | | ○ |
| 10 | GPS/ESTIMATED PATH LOCATION COINCIDENCE BASED ON INTER-COORDINATE HEADINGS | | | | ○ |

FIG. 3

| RELIABILITY | PREVIOUS RELIABILITY | CUMULATIVE HEADING ERROR [1°] | GYRO SENSITIVITY LEARNING STATE | ESTIMATED HEADING RELIABILITY | DISTANCE COEFFICIENT LEARNING STATE |
|---|---|---|---|---|---|
| 1 | 1 | 45~ | UNLEARNED | 1 | UNLEARNED |
| 2 | 2 | 10~45 | 1~10 | 2 | 1~10 |
| 3 | 3 | 3~10 | 11~20 | 3 | 11~20 |
| 4 | 4 | 1~3 | 21~30 | 4 | 21~30 |
| 5 | 5 | 0~1 | 31 OR MORE | 5 | 31 OR MORE |

FIG. 4

| RELIABILITY | GPS/ESTIMATED PATH HEADING COINCIDENCE (AVG. HEADING DIFFERENCE [°]) | SPEED [km/h] | HDOP | GPS/ESTIMATED PATH POSITION COINCIDENCE BASED ON INTER-COORDINATE DISTANCES (CORRELATION VALUE) | GPS/ESTIMATED PATH POSITION COINCIDENCE BASED ON INTER-COORDINATE HEADINGS (CORRELATION VALUE) |
|---|---|---|---|---|---|
| 1 | 20 OR MORE | 0 | 4.1~ | 41 OR MORE | 41 OR MORE |
| 2 | 11~20 | 1~10 | 3.1~4.0 | 31~40 | 31~40 |
| 3 | 6~10 | 11~20 | 2.1~3.0 | 21~30 | 21~30 |
| 4 | 1~5 | 21~30 | 1.1~2.0 | 11~20 | 11~20 |
| 5 | 0 | 31~ | 1.0 | 0~10 | 0~10 |

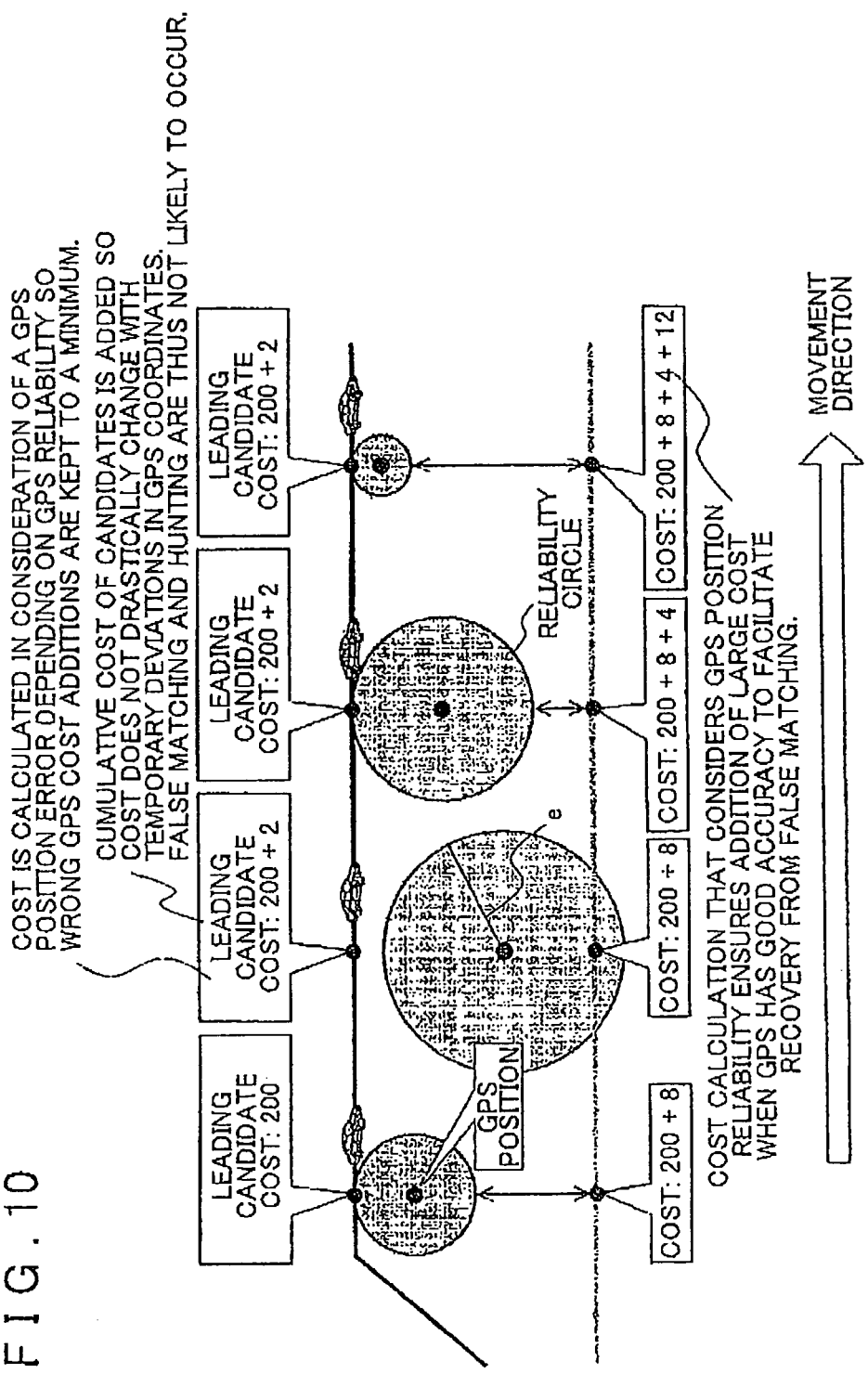

NAVIGATION DEVICE, METHOD, AND PROGRAM

INCORPORATION BY REFERENCE

The disclosure of Japanese Patent Application No. 2009-043791, filed on Feb. 26, 2009, including the specification, drawings and abstract is incorporated herein by reference in its entirety.

BACKGROUND

1. Related Technical Fields

Related technical fields include navigation devices, methods, and programs that perform map matching for navigation.

2. Related Art

On-vehicle navigation devices that find a travel route to a destination and guide the vehicle are widely used. This type of navigation device identifies the current position of the vehicle, displays the vehicle's current position on a map, and provides travel guidance. Types of sensors used for identifying the current position include gyro, vehicle speed pulse, and acceleration sensors, and an estimated path is generated from the sensor information using dead reckoning navigation. Shape matching of the estimated path and road information stored in a database is performed, and a position where the two coincide is identified as the current position. A current position mark that represents the host vehicle position is displayed at the identified current position. The matching method may assign a cost value that represents a match probability based on various information in order to each match candidate. After comparing cost values, a match is then made to the match candidate with the smallest cost value.

GPS is used for measuring an absolute position (latitude, longitude) of the vehicle. GPS information is used in sensor learning when the GPS accuracy is high, but not always used for position correction during normal updating of the current position. This is because multipath or similar effects, a weakness of GPS, may reduce the accuracy.

If the current position is identified by dead reckoning navigation in this manner, false matching of the current position may be more likely to occur for the following reasons when an angle formed by a plurality of roads branching at a narrow angle (narrow angle branching) is equal to or less than a predetermined angle, for example. Because the road following the route as judged from the road type, link shape and the like is given priority during matching, a false match may result when the host vehicle advances on a road separate from the road following the route. A false match to the wrong road may also occur depending on a heading error of the estimated path. The actual road, which has width, is expressed as a line (link) in the database. Consequently, the actual travel route and the link shape may not coincide, and matching to the correct road may not be possible even after comparing the estimated path and the link shape.

Once a false match is made at a narrow angle branching, recovery (matching to the correct road) may be delayed for the following reasons. Namely, in a case where both roads are practically parallel after a narrow angle branching, a comparison between the estimated path and the link shape shows no difference. Therefore, recovering matching to the correct road is difficult. The displayed estimated path may also be corrected so as to overlap the falsely matched link, making recovery to the correct road in such case even more difficult.

Japanese Patent Application Publication No. JP-A-2006-284499 proposes art that uses a GPS positioning point in order to avoid such false matching after a narrow angle branching. According to JP-A-2006-284499, an error circle is set centered on a GPS positioning point and has an error radius that corresponds to the DOP (dilution of precision). A host vehicle position detected within the range of the error circle is considered correct. After passing a branch point, the error circle is reduced in a stepped manner from the branch point so that candidate points in the case of a false match are quickly removed from the error circle and a recovery to the correct road can be made accordingly.

SUMMARY

However, the art described in JP-A-2006-284499 does not take into account the width of the actual road, and only determines whether a link shape in the road data is included in the error circle. Therefore, even though the actual vehicle is traveling within the range of a width removed from the link, a false match may be determined if the link is outside the error circle.

Exemplary implementations of the broad inventive principles described herein further reduce false matching and promptly recovers from false matching.

Exemplary implementations, when identifying a leading candidate point by calculating a cost for candidate points set on roads, the leading candidate point is identified based on a cost calculation that considers a road width W and a distance d between a GPS position and each candidate point. Therefore, false matching can be reduced and a prompt recovery can be made in the case of a false match.

Exemplary implementations provide devices, methods, and programs that acquire an estimated position of a vehicle based on dead reckoning navigation, acquire a GPS position of the vehicle based on GPS, and set the candidate points for the vehicle position on roads in the vicinity of the estimated position. The devices, methods, and programs calculate for each candidate point a normal cost of the candidate point with respect to the estimated position and calculate for each candidate point a correction cost that corresponds to a value L1, the value L1 being found by subtracting a width W of a road set with the candidate point from a distance d between the GPS position and the candidate point. The devices, methods, and programs identify the leading candidate point based on a total cost of the normal cost and the correction cost for each candidate point.

BRIEF DESCRIPTION OF THE DRAWINGS

FIGS. 2A and 2B are explanatory drawings that outline factors and definitions of reliability;

FIG. 3 is an explanatory drawing of factors that determine the reliability of an estimated heading and distance;

FIG. 4 is an explanatory drawing of factors that determine the reliability of a GPS heading and distance;

FIG. 10 is an explanatory drawing that shows the relationship between a cost for each candidate point and a leading candidate point when correctly matched to a road after a narrow angle branching;

DETAILED DESCRIPTION OF EXEMPLARY IMPLEMENTATIONS

Figure 1:
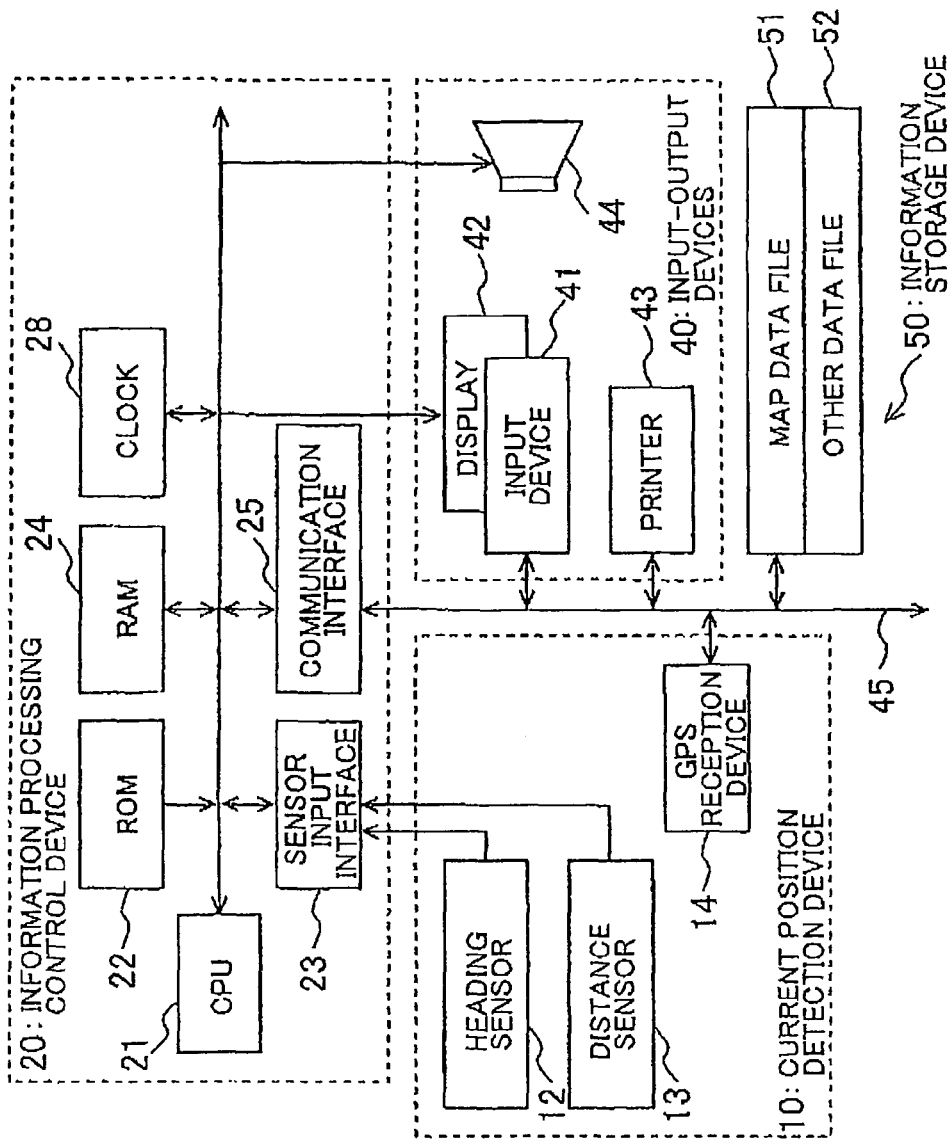
FIG. 1 is a system diagram of a navigation device according to an example.
Figure 5:
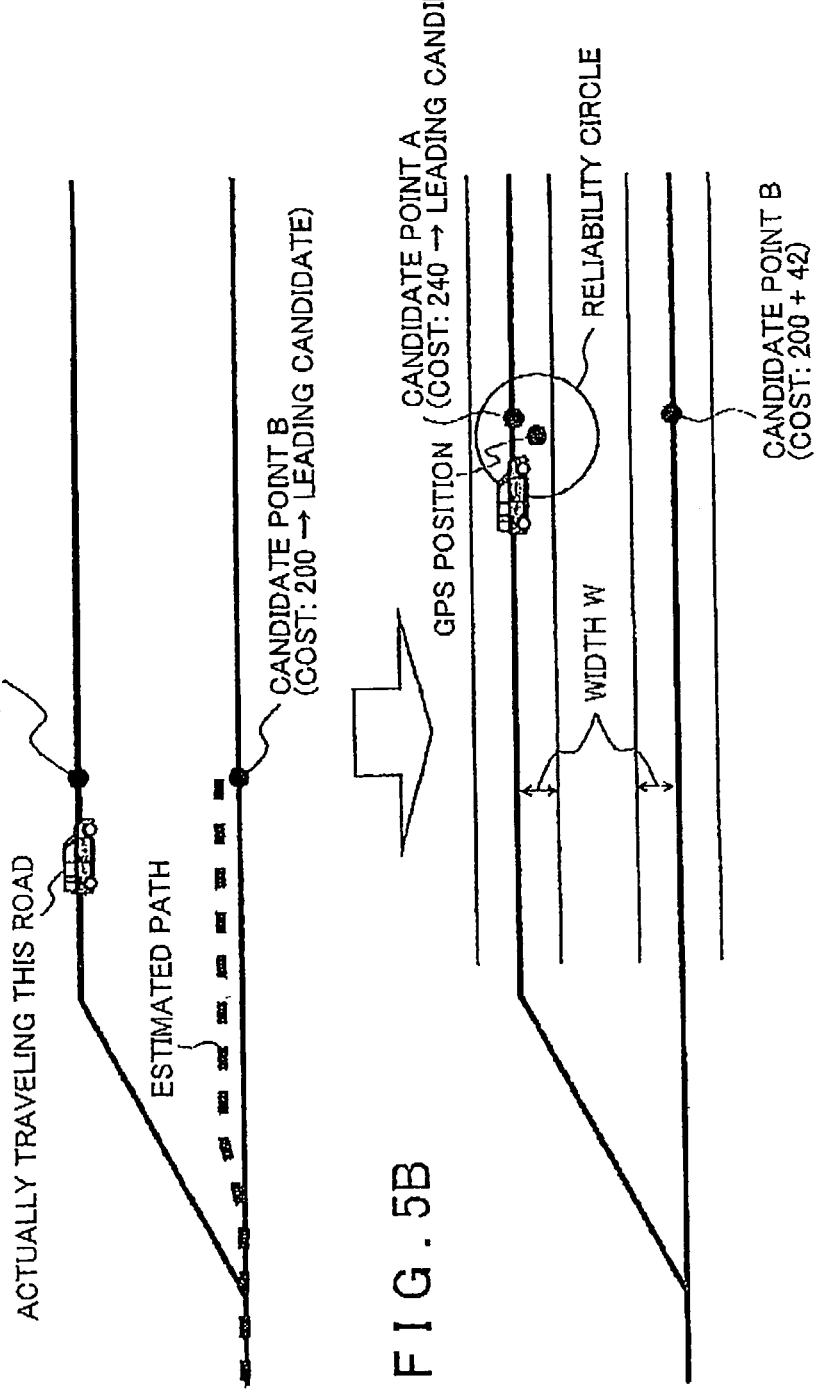
FIGS. 5A and 5B are explanatory drawings that show map matching states when a GPS reliability and a road width are and are not considered.

An example of a navigation device and a navigation program will be described in detail below with reference to FIGS. 1 to 12.

I. Overview of the Example

Surely matching to the correct road after passing a narrow angle branching is difficult using dead reckoning navigation alone. Therefore, in the navigation device of the present example, a cost calculation for each candidate point adds a GPS cost (correction cost) that corresponds to a distance from GPS coordinates to a normal cost according to a normal cost calculation to promptly recover matching to the correct road. In such case, the GPS coordinates may have errors, or the vehicle may be traveling at a position on a wide road that is distant from a database link. Therefore, the cost is also calculated in consideration of the GPS reliability and the road width.

The normal cost in map matching is calculated as follows. A movement distance and travel heading of the vehicle is detected by a distance sensor and a relative heading sensor, and a current position (estimated position) is estimated (by dead reckoning navigation) on map data. Previous candidate points set on roads within a predetermined distance range from the estimated position are moved in accordance with the movement distance of the vehicle. The distance from the estimated position to the candidate points, heading, and the like are used as parameters to calculate the normal cost for each candidate point.

For GPS reliability, an error circle based on DOP may be used. In the present example, the GPS reliability is used to further increase accuracy. Namely, in addition to DOP, the distance between a GPS position and a vehicle position based on an estimated path (distance coincidence) and the coincidence of a GPS heading and a heading based on the estimated path are also considered. Consequently, the range of error can be calculated with better precision, and a reliability circle (whose radius equals a speculative maximum error e) with a smaller error range can be used. For a candidate point where a distance d to the GPS position is equal to or less than a width W, there is a high probability that the vehicle is traveling on the road set with the candidate point, so the GPS cost (correction cost) is set to zero. For a candidate point where the distance d is greater than the width W, a GPS cost that increases in accordance with the distance d is added. For the GPS cost, if a point (width point) w that is separated from the candidate point by the width W of the road is within the reliability circle, a GPS cost k1 that corresponds to a distance L1 between the GPS position and the width point w is added. In the case of no width point w within the reliability circle, the GPS cost k1 when the distance L1 equals the speculative maximum error e (the cost k1 when the candidate point is positioned on the reliability circle) is added. And a GPS cost k2 that corresponds to a distance L2 from the width point w to the reliability circle is further added. However, the GPS cost k2 is provided with an upper limit in order to prevent the GPS cost from becoming excessively large. Thus, candidate points whose cost exceeds a predetermined value are excluded as candidates, which avoids the cumulative addition of excessively large GPS costs and consequent prompt exclusion of candidate points as candidates.

In a modification, if the timing of arrival at a branch differs from reality, a comparison of the link and the displayed estimated path cannot be suitably performed. Therefore, in order to correct before and after positions, the GPS coordinates and a barycenter of the matching candidates are compared. If there is a difference, the update interval of the matching candidates is varied to gradually correct the positions.

II. Details of the Example

FIG. 1 is a system configuration diagram of the navigation device in which the present example is used. The navigation device is installed in a vehicle and, as shown in FIG. 1, includes a current position detection device 10, an information processing control device 20, input-output devices 40, and an information storage device 50.

The current position detection device 10 is structured as follows. A heading sensor 12 detects an angle that changes relative to a reference angle (absolute heading). The present example employs a gyro sensor that uses angular velocity to detect angular variation. Note that the heading sensor 12 may be an optical rotation sensor that is attached to a rotating portion of the steering wheel, a rotating type of resistance volume, or an angle sensor that is attached to a wheel portion of the vehicle. The heading sensor 12 is a geomagnetic sensor that detects the direction in which the vehicle is facing, by using a magnet to detect the direction north, for example. The heading sensor 12 may be any unit that detects an absolute heading.

A distance sensor 13 can measure the movement distance of the vehicle, and may detect and count rotations of the wheel or detect and integrate twice an acceleration, for example. A GPS (Global Positioning System) reception device 14 receives signals from an artificial satellite, and is capable of obtaining various information such as the signal transmission time, positional information relating to the reception device, the movement speed of the reception device and the advancing direction of the reception device.

The information processing control device 20 is a device for performing computations and control on the basis of information input from the current position detection device 10 and the input-output devices 40 and information stored in the information storage device 50, and performing control to ensure that the computation results are output to an output unit such as a display 42, a printer 43 or a speaker 44.

The information processing control device 20 is structured as follows. A controller (e.g., CPU (central processing unit) 21) performs overall computations and control for the entire navigation device. A ROM 22 stores various programs such as programs relating to navigation, including route searches to a destination and display and voice guidance, and map matching processing programs according to the present example that are based on cost calculations that consider GPS reliability and a road width. The ROM 22 may be divided into a first ROM and a second ROM, wherein navigation programs relating to voice guidance are stored in the second ROM and the other programs are stored in the first ROM. Reliability data described later is defined in the map matching program of the present example. However, a reference table of reliability data may be provided independent of the program and reliability data referenced over the course of executing the program, or reliability data files may be saved to the information storage device 50.

A RAM 24 stores information that the user inputs, such as destination information, information on a point that the vehicle passes, and the like that are input from an input device 41. The RAM 24 is also a storage unit for storing the results of computations that the CPU 21 makes based on the information that is input by the user, route search results, and map information that is read in from the information storage device 50. In addition, the RAM 24 temporarily saves an estimated position and candidate points that are to be used in map matching according to the present example.

A communication interface 25 inputs and outputs various information through a transmission line 45. More specifically, the GPS reception device 14, the input device 41, the printer 43, and the information storage device 50 are connected through the transmission line 45. A clock 28 keeps time. An image processor dedicated to image processing and used for processing vector information that is processed by the CPU 21 into image information, an image memory that stores the image information processed by the image processor, and an audio processor dedicated to audio processing and used for processing audio information read in from the information storage device 50 and outputting to the speaker 44 may be additionally provided.

The input-output devices 40 include the input device 41, the display 42, the printer 43, and the speaker 44. The user uses the input device 41 to input data such as a destination, a point that the vehicle passes, a search condition, and the like. The display 42 displays an image. The printer 43 prints information. The speaker 44 outputs the audio information. The input device 41 includes a touch panel, a touch switch, a joystick, a key switch, or similar, for example. The display 42 displays a map of the periphery of the current location and a travel route to the destination. Note that the input-output devices 40 may not include the printer 43.

The information storage device 50 is connected to the information processing control device 20 through the transmission line 45. The information storage device 50 stores a map data file 51 and an other data file 52. The information storage device 50 is generally configured from an optical storage medium such as a DVD-ROM or a CD-ROM, or from a magnetic storage medium such as a hard disk or the like, but it may also be configured from any one of various types of storage media, such as a magneto optical disk, various types of semiconductor memory, or the like. Note that the information storage device 50 may be configured from a rewritable hard disk, flash memory or the like for information requiring rewriting, and a ROM such as a CD-ROM or DVD-ROM used for other static information.

The map data file 51 stores map data, road data, destination data, guidance point data, and other data as various data required for map display, route searching, and route guidance in navigation. As map data, a national road map, road maps of various regions, residential maps, and the like are stored. The road maps include various types of roads, such as main arterial roads, expressways, secondary roads, and the like, as well as terrestrial landmarks (facilities and the like). The residential maps include graphics that show the shapes of terrestrial structures and the like, as well as street maps that indicate street names and the like. The secondary roads are comparatively narrow roads with rights of way that are narrower than the prescribed values for national routes and prefectural routes. The map data includes a map with a fixed range according to a predetermined scale, which includes the vehicle current position and points instructed by the user and is displayed on the display 42. The current position of the vehicle and instructed points are displayed on the map.

The road data includes node data and link data, which are data relating to roads such as road locations and types, the number of vehicle lanes, and connection relationships between roads, as well as a road width and narrow angle branching information that specifies when a branching road is a narrow angle branching used in the present example. The road data is used in route searching and map matching, and also used when a travel route found is displayed superimposed on the map data. The node data represents geographical coordinate data of nodes that are used for route searches on maps. For example, connection points of roads such as intersections are represented by nodes, and roads between connection points (that is, non-branching areas of roads) are expressed by links. Thus, the node data also functions as route data that represents route connection relationships. Attributes expressing traffic regulations that constrain travel, including no entry and one-way traffic, are assigned to the links, and such attributes may also be assigned to intersection nodes. The node data includes intersection nodes that are always set for intersections, and auxiliary nodes that may be secondarily set at characteristic points between intersections (e.g. points that specify the start, middle and end of curves, points where the elevation changes, and the like). Intersection nodes include information relating to intersections, such as the names and geographical position coordinates of intersections.

The destination data includes the names and locations of major tourist areas, buildings, facilities, places such as companies and sales offices that are listed in telephone directories and that are highly likely to become destinations, and the like. The guidance point data is guidance data for points requiring guidance, including guidance on branch points and the content of guide signs placed along roads.

The other data file 52 stores image data of photographs that show various facilities and tourist areas as well as locations that require a visual display such as a major intersection, and audio data for when a set travel route is guided by audio.

Next, reliability data that is defined in the map matching program of the present example will be described. FIGS. 2A and 2B outline definitions and factors of reliability. FIG. 2A specifies speculative errors for heading and distance with respect to reliability in the present example. With regard to heading, a speculative heading error of within 1 degree is assigned a reliability of 5, a speculative heading error of within 3 degrees is assigned a reliability of 4, a speculative heading error of within 10 degrees is assigned a reliability of 3, a speculative heading error of within 45 degrees is assigned a reliability of 2, and an unknown speculative heading error is assigned a reliability of 1.

With regard to distance, a speculative distance error of within 5 meters is assigned a reliability of 5, a speculative distance error of within 10 meters is assigned a reliability of 4, a speculative distance error of within 25 meters is assigned a reliability of 3, a speculative distance error of within 50 meters is assigned a reliability of 2, and an unknown speculative distance error is assigned a reliability of 1. The speculative distance error value is a speculative maximum error e (radius of a reliability circle) in the present example.

As described above, five levels of reliability are assigned for both heading and distance in the present example. However, more levels of reliability (e.g. 10 levels) may be assigned. Note that the speculative errors (for heading and distance) are specified in advance using actual measurements of values for each factor of reliability and error in each case.

FIG. 2B shows factors used for determining the reliability of the estimated heading and estimated distance, and the reliability of the heading and distance based on GPS. As shown in the figure, factors that determine the estimated (heading, distance) reliability include: previous reliability, speculative cumulative heading error, gyro sensitivity learning state, estimated heading reliability, and distance coefficient learning state. Factors that determine the GPS (heading, distance) reliability include: GPS/estimated path heading coincidence, speed, DOP, GPS/estimated path position coincidence based on inter-coordinate distances, and GPS/estimated path position coincidence based on inter-coordinate headings.

As FIG. 2B shows, the reliability of the estimated heading is determined from the previous reliability, the speculative cumulative heading error, and the gyro sensitivity learning state. The reliability of the estimated distance is determined from the previous reliability, the estimated heading reliability, and the distance coefficient learning state. The reliability of the GPS heading is determined from the GPS/estimated path heading coincidence, speed, and DOP. The reliability of the GPS distance is determined from the DOP, the GPS/estimated path position coincidence based on the inter-coordinate distances, and the GPS/estimated path position coincidence based on the inter-coordinate headings.

FIG. 3 specifies factors that determine the reliability of the estimated heading and distance. For the previous reliability, as shown in FIG. 3, the reliability of the estimated heading and the reliability of the estimated distance calculated during the previous map matching are used without modification. This is because, barring a gyro failure, the reliability of the estimated heading calculated by dead reckoning navigation is unlikely to change drastically, so the previous reliability is used unchanged.

Normally, if the right and left sides of the navigation device are horizontally installed, the right and left sensitivities of the gyro sensor are practically equal. Consequently, if the right and left sensitivities of the gyro sensor become unequal, there is a high probability that learning for right-left sensitivity will be wrong and result in errors when the heading changes. Hence, because the heading error is likely to accumulate and grow with respect to heading variations while traveling a predetermined segment (e.g. 10 meters), the speculative cumulative heading error is set such that the reliability decreases as the cumulative heading error (degree) increases. In the present example, the heading error rate is set as 0.1% for a right-left sensitivity difference of 1°. Thus, a product value from multiplying a gyro sensor right-left sensitivity difference of a° by 0.001 is accumulated each time the vehicle travels a predetermined segment. Note that a post-correction right-left sensitivity difference based on gyro sensitivity learning described next is used as the right-left sensitivity difference.

The gyro sensitivity learning state represents the number of times of sensitivity learning with respect to the gyro sensor. The accuracy of the estimated heading can be considered low if the number of times of sensitivity learning is small, and the accuracy can be considered high if the number of times of sensitivity learning is large. Therefore, the reliability is set so as to increase in accordance with an increase in the number of times of learning. Regarding the number of times of gyro sensor sensitivity learning in the present example, learning for a left turn and learning for a right turn are considered a set and counted as one time.

Here, the gyro sensitivity learning corrects the sensitivity of the gyro sensor with respect to right and left turns, and is performed using various common methods. For example, angles calculated from the gyro sensor during right and left turns may be corrected by angles calculated from a travel path based on GPS positioning. Corrections made based on GPS positioning with low accuracy may reduce the sensitivity. Therefore, this learning is performed during right and left turns when the GPS positioning has high accuracy. Such learning may use a GPS speed of 30 km/h or more and an error circle calculated from DOP having a diameter of 100 meters or less as learning start conditions. Note that the absence of buildings of at least a predetermined height around the vehicle current position may be further added as a learning start condition.

The estimated heading reliability is used for calculating the reliability of the estimated distance. If the estimated heading reliability is high, then the accuracy of the estimated distance can also be considered high. Therefore, the estimated heading reliability (a final value calculated from various factors) is used without modification.

The distance coefficient learning state represents the number of times of learning with respect to distance. The accuracy of the distance coefficient can be considered high (the accuracy of the estimated distance can be considered high) if the number of times of learning is large, so the reliability of the estimated distance is also set high. Here, distance learning may also use various common methods similar to the gyro sensitivity learning. For example, using the movement distance of the vehicle calculated from GPS positioning as a reference, the number of distance pulses output by the distance sensor that measures the traveling distance of the vehicle is counted, and the number of times the movement distance was calculated for one distance pulse is set as the number of times of learning. The movement distance per one distance pulse is statistically determined based on the most common value among a distribution of movement distances calculated in each learning. Note that similar to gyro learning, distance learning is performed when the GPS accuracy is high and learning start conditions must be satisfied while the vehicle moves a predetermined distance.

FIG. 4 specifies the factors that determine the reliability of the GPS heading and distance. The GPS/estimated path heading coincidence determines the degree of coincidence of the path shape according to GPS and the estimated path shape. If the variation amount of the estimated heading and the variation amount of the GPS heading are similar (if the difference is small), the accuracy of the GPS heading can be considered high. Therefore, as shown in FIG. 4, the reliability of the GPS heading is set so as to increase with a higher degree of coincidence of both headings.

Here, the GPS/estimated path heading coincidence is calculated as follows.

(a) A GPS reliability calculation position (latest GPS positioning point) is designated as a base point. A base point for the estimated path is similarly set to a position that is synchronized with the GPS base point.

(b) A maximum of 20 GPS positioning points are acquired at positioning point intervals from the base point, and a heading variation amount from the base heading is acquired for each positioning point. At such time, the GPS continuity (positioning interval) is set to within 5 seconds (with processing executed even when positioning is not performed for 2 or 3 seconds). Likewise for the estimated path, the heading variation amount from the base heading is acquired for each point corresponding to the positioning points (the estimated path coordinates are synchronized with the GPS positioning location).

(c) The differences between corresponding positioning points are calculated for each of the acquired heading variation amounts of the GPS and estimated path, and summed to calculate an average value (correlation value). This correlation value is the average heading difference (°) in FIG. 4. Note that only GPS headings corresponding to a GPS heading reliability of 2 or more are acquired.

If the GPS speed is fast, the accuracy of the GPS heading can be considered to increase. Therefore, as shown in FIG. 4, the reliability is also set so as to increase accordingly.

DOP (dilution of precision) is a value that indicates a position-fix accuracy calculated from the positioning of GPS satellites. A smaller DOP is likely associated with a comparatively highly accurate GPS distance and GPS heading. Therefore, as shown in FIG. 4, the reliability is also set so as to increase accordingly. Note that a DOP value of 1.0 is the best value. Types of DOP include geometrical dilution of precision (GDOP), horizontal dilution of precision (HDOP), position dilution of precision (PDOP), and relative dilution of precision (RDOP). The present example uses HDOP, but other types may be used alone or in combination. DOP is calculated by the GPS reception device 14.

The GPS/estimated path position coincidence based on inter-coordinate distances is specified in FIG. 4. If the distance degree of coincidence with the estimated path is high, the accuracy of the GPS distance can also be considered high. Therefore, the reliability of the GPS/estimated path position coincidence based on inter-coordinate distances is also set so as to increase accordingly.

The GPS/estimated path position coincidence based on inter-coordinate distances is calculated as follows.

(a) A GPS reliability calculation position (latest GPS positioning point) is designated as a base point. A base point for the estimated path is similarly set to an estimated path position to be measured that corresponds to the GPS base point.

(b) Ten GPS positioning points are acquired at intervals of 10 meters or more from the GPS base point position, and the distances between the coordinates of the positioning points and the base point (inter-coordinate distances) are calculated. Likewise for the estimated path, the distances between the coordinates of the positions corresponding to the GPS positioning points and the base point of the estimated position are calculated.

(c) The difference between the inter-coordinate distances of corresponding GPS positions (positioning points) and estimated positions as calculated at (b) are calculated for each positioning point, and the sum of the square of each difference is found to calculate an average value (correlation value). Reliability is determined from this correlation value.

The GPS/estimated path position coincidence based on inter-coordinate headings is specified in FIG. 4. Namely, if the heading degree of coincidence with the estimated path is high, the accuracy of the GPS heading can also be considered high. Therefore, the reliability of the GPS/estimated path position coincidence based on inter-coordinate headings is also set so as to increase accordingly.

The GPS/estimated path position coincidence based on inter-coordinate headings is calculated as follows.

(a) A maximum of 10 GPS positioning points at intervals of 10 meters or more from the GPS reliability calculation position (latest GPS positioning point) are acquired. Based on the coordinates between two adjacent points, the heading between the two points is calculated. Note that in the present example, the intervals are set to 10 meters or more because a smaller interval between compared points will result in even slight deviations causing large changes to the heading. Likewise for the estimated path, based on the coordinates between two adjacent points among the positions corresponding to the GPS positioning points, the heading between the two points is calculated.

(b) The difference between adjacent headings among the headings calculated based on the GPS positioning points is found to calculate the estimated heading variation amount. Likewise for the estimated path, the difference between adjacent headings among the headings calculated based on the points is found to calculate the heading variation amount.

(c) The differences between corresponding GPS and estimated heading variation amounts as calculated at (b) are calculated for each point, and the sum of the square of each difference is found to calculate an average value (correlation value). Reliability is determined from this correlation value.

After finding the reliability of each factor as described above, the reliability of the final estimated heading and distance, and GPS heading and distance are calculated as average values of reliability for each factor. For example, regarding the reliability of the GPS distance, if the reliability according to DOP is 4, the reliability according to the GPS/estimated path position coincidence based on inter-coordinate distances is 3, and the reliability according to the GPS/estimated path position coincidence based on inter-coordinate headings is 3, the average value of the reliability of these three factors is 3.33. When the speculative heading error (speculative maximum error e) shown in FIG. 2A is calculated, a value of 3 that is rounded off from the calculated average value of 3.33 is set as the reliability (wherein an average value of 3.4 is rounded down to 3 and an average value of 3.5 is rounded up to 4, for example). Thus, the speculative heading error that corresponds to the reliability of 3 is within 10 degrees. Note that in order to further increase accuracy, the rules for rounding the calculated average value may be modified such that, for example, an average value of 3.5 is rounded down to 3 and an average value of 3.6 is rounded up to 4, or an average value of 3.6 is rounded down to 3 and an average value of 3.7 is rounded up to 4, or the average value may be rounded down to the nearest whole number.

The reliability of each factor may also be weighted. In such case, the weight of the previous reliability may be higher than that for other factors. For example, the previous reliability may have 1.5 times more weight, the reliability of the speculative cumulative heading error 0.8 times less weight, and the reliability of the gyro sensitivity learning state 0.7 times less weight. Based on the reliability calculated for each factor, a final reliability may be determined using a fuzzy control.

The navigation device detects the current position using the current position detection device 10, reads map information relating to the periphery of the current position from the map data file 51 in the information storage device 50, and displays the read map information on the display 42. When a destination is input through the input device 41, the information processing control device 20 searches for (calculates) a plurality of travel route candidates from the current position to the destination and displays the travel route candidates on the map displayed on the display 42. Then, when the driver selects one of the travel routes, the selected travel route is stored in the RAM 24. Thus, a travel route is obtained (travel route acquisition unit).

Note that the information processing control device 20 may also acquire the travel route by transmitting the current position of the vehicle (or a departure point that is input) and the destination to an information processing center and receiving a travel route to the destination that has been found by the information processing center. In this case, communication of the destination and travel route is performed by wireless communication via the communication interface 25. Further, a travel route from the departure point to the destination may be searched using an information processing device such as a home personal computer or the like, whereupon the travel route is stored in a storage medium such as USB memory and obtained via a corresponding storage medium reading device. The storage medium reading device in this case is connected to the information processing control device 20 through the transmission line 45.

While the vehicle is moving, route guidance is performed by tracking the current position detected by the current position detection device 10. The route guidance specifies the vehicle's position on the map by performing map matching between the road data that corresponds to the chosen route and the current position that is detected by the current position detection device 10, then displays the chosen route and a current position mark that indicates the current position of the vehicle on the map of the area surrounding the current position of the vehicle, which is displayed on the display 42. Based on the relationship between the chosen route and the current position, a determination is made as to whether guidance is necessary. For example, in a case where the vehicle continues moving straight ahead for more than a predetermined distance, a determination is made as to whether route guidance regarding a route change point or the like and heading guidance are necessary. If the guidance is necessary, the guidance is provided by a display on the display 42 and by audio.

The map matching process that is performed by the navigation device structured in this manner will be described next. FIGS. 5A and 5B show the identification of the current position (determination of the leading candidate) according to the map matching process executed after passing a branch point, when GPS reliability and road width are considered and are not considered (conventional). According to conventional map matching, as shown in FIG. 5A, even if the vehicle is actually traveling on the upper road in the figure, once a false match is made to the lower road after passing the branch point, the current position and the travel path are revised to the matched link (road). Consequently, in the normal cost calculation, recovery from the false matching situation is difficult until the direction of the actual traveled road or the like significantly changes.

Conversely, in the map matching process according to the present example, even if a false match occurs after passing a narrow angle branching, with regard to a candidate point B on the falsely matched road as shown in FIG. 5B, the distance d to the GPS position is not equal to or less than the width W and a point separated from the candidate point B by the width W does not exist within the reliability circle. Therefore, a large GPS cost is cumulatively added to the normal cost after passing the branch point. Meanwhile, with regard to a candidate point A set on the actually traveled road (upper road in the figure), the distance d to the GPS position is equal to or less than the width W, so the GPS cost is not added.

Each time a branch point is passed, the GPS cost is thus cumulatively added to the normal cost found by the cost calculation. Therefore, as shown in FIG. 5B, the leading candidate point changes from the candidate point B to the candidate point A, and a match to the correct road can be made even when both roads after a branch point are parallel to each other.

Because the GPS cost is cumulatively added, the cost found by adding the GPS cost to the normal cost when the correct road is matched does not suddenly change (significantly change) even if there is a large temporary deviation in the GPS position. Therefore, false matching and hunting (repeatedly changing the matching target) is less prone to occur.

In the present example, even if the distance d to the GPS position is greater than the width W, when the width point w separated from a candidate point by the road width W exists within the reliability circle, there is a possibility that the vehicle is traveling on the road set with the candidate point. Therefore, the GPS cost to be added can be further reduced compared to when the width point w does not exist within the reliability circle. By considering the width of each road in this manner, the map matching accuracy can be further increased.

In the present example, a reliability circle with higher accuracy than the GPS error circle based on the DOP, that is, a circle with a smaller radius than the error circle, is used. Therefore, it is possible to recover more quickly from false matching.

Figure 6:
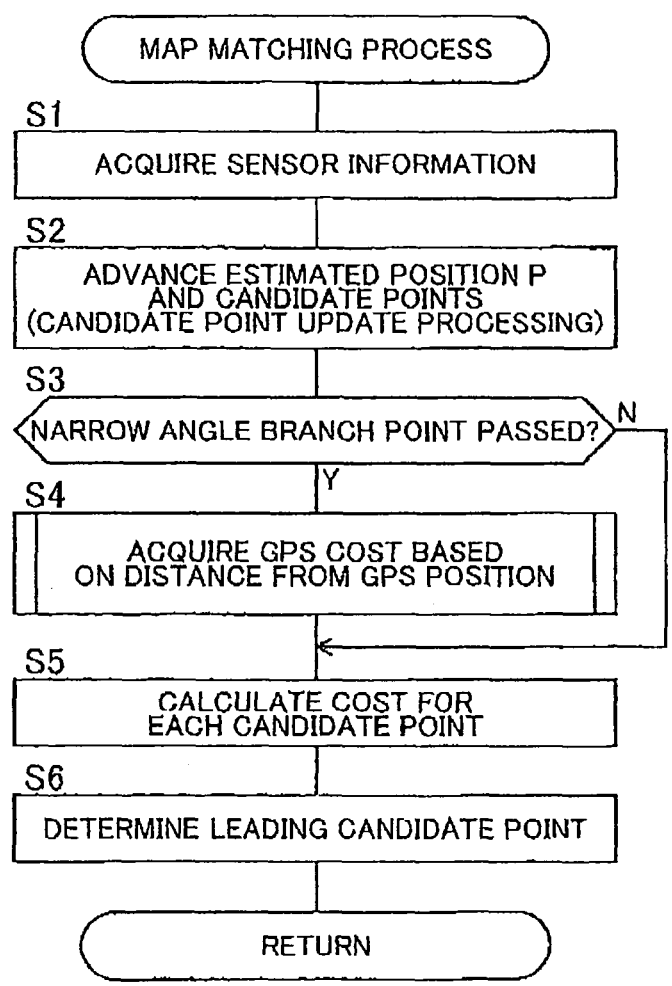
FIG. 6 is a flowchart that shows a map matching process in detail.

FIG. 6 is a flowchart that shows an algorithm of a map matching process according to the present example in detail. The exemplary process may be implemented, for example, by one or more components of the above-described navigation device. For example, the exemplary method may be implemented by the CPU 21 and or information processing control device 20 executing a computer program stored in the first ROM 22, second RAM 24, and/or the information storage device 50. However, even though the exemplary structure of the above-described navigation device may be referenced in the description, it should be appreciated that the structure is exemplary and the exemplary process need not be limited by any of the above-described exemplary structure.

The information processing control device 20 acquires various sensor information detected by the current position detection device 10 and the like (S1). The information processing control device 20 then advances an estimated position P of the vehicle based on dead reckoning navigation and positions of candidate points according to the following sequence (S2). Using a previous estimated position (P0) as a reference, an estimated position (P1) based on the vehicle movement distance and heading is calculated, and an estimated heading (advancing direction) at the estimated position P1 based on the estimated path is calculated. Candidate points for the estimated position P1 are identified.

The candidate points are set as points identified on roads within a predetermined distance Lm from the estimated position P1, and which correspond to candidate points matched at the previous estimated position P0 that have been moved along the road by an amount corresponding to the movement distance of the vehicle. Note that if there are no points within the predetermined distance Lm from the estimated position P1 after moving the previous candidate point P0 along the road by an amount that corresponds to the movement distance of the vehicle, the candidate point is excluded as a candidate. If new roads caused by a branch, intersection or the like that continue from roads where candidate points existed during the previous map matching are present within the predetermined distance from the estimated position P1, points on these roads that were moved from the previous estimated position P0 by an amount corresponding to the movement distance of the vehicle are set as candidate points. If a new road that does not continue from any of the road where candidate points existed during the previous map matching is present within the predetermined distance from the estimated position P1, a point that intersects a perpendicular line extending from the estimated position P1 to the road is set as a new candidate point.

Next, the information processing control device 20 determines whether the vehicle passed a narrow angle branch point (S3). Map matching according to the present example that considers the width W and the GPS reliability is performed for a predetermined distance after passing the narrow angle branch point. Therefore, passage is determined within a predetermined distance (e.g. 1 km) after passing the branch point. Whether the branching is a narrow angle branching is determined based on narrow angle branching information that specifies when a branching road in the road data file 54 is a narrow angle branching.

If a narrow angle branching was not passed (S3: N), the information processing control device 20 proceeds to S5 and performs a normal cost calculation (described later) for each candidate point moved at S2 (S5). However, if a narrow angle branching was passed (S3: Y), the information processing control device 20 acquires the GPS cost based on the distance from the GPS position (S4).

Figure 7:
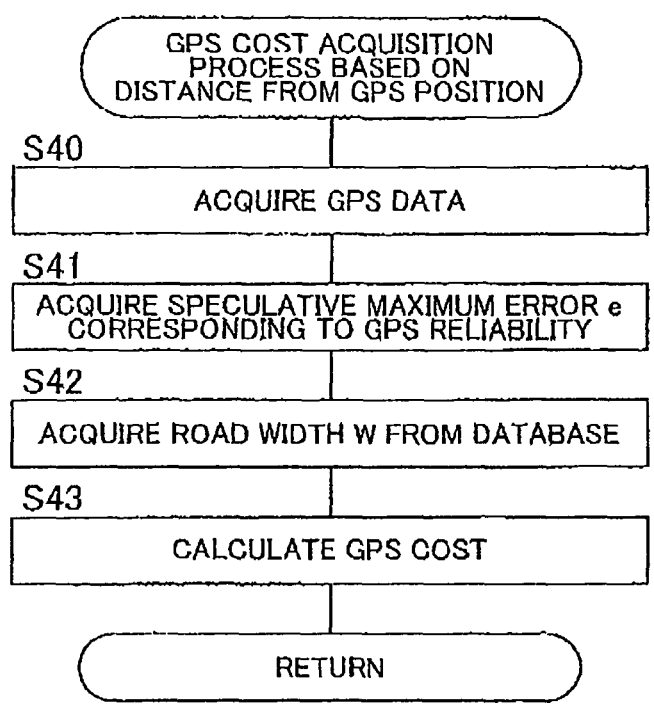
FIG. 7 is a flowchart that shows a GPS cost acquisition process based on a distance from a GPS position.
Figure 8:
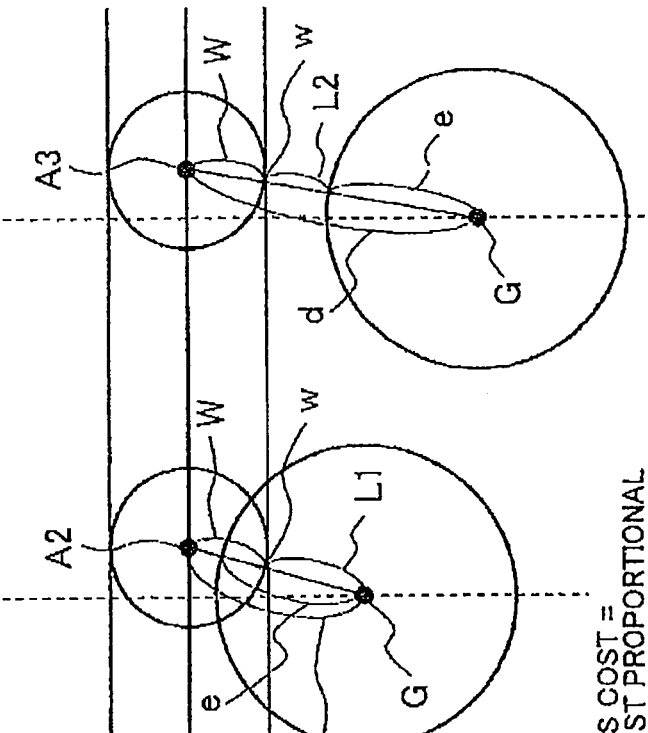
FIGS. 8A to 8C are explanatory drawings of the relationship between a GPS position G and a width W for a candidate point.

FIG. 7 is a flowchart that shows an algorithm of a GPS cost acquisition process based on the distance from the GPS position. The exemplary process may be implemented, for example, by one or more components of the above-described navigation device. For example, the exemplary method may be implemented by the CPU 21 and or information processing control device 20 executing a computer program stored in the first ROM 22, second RAM 24, and/or the information storage device 50. However, even though the exemplary structure of the above-described navigation device may be referenced in the description, it should be appreciated that the structure is exemplary and the exemplary process need not be limited by any of the above-described exemplary structure.

The information processing control device 20 acquires GPS data (S40), and acquires the speculative maximum error e that corresponds to the GPS reliability (S41). In other words, as explained using FIG. 4, the information processing control device 20 calculates the reliability of each factor for GPS distance (DOP, GPS/estimated path position coincidence based on inter-coordinate distances, GPS/estimated path position coincidence based on inter-coordinate headings), and rounds off an average value thereof to find the GPS reliability and acquires the speculative maximum error e that corresponds to this reliability (a distance that corresponds to the reliability shown in FIG. 2A).

The information processing control device 20 also acquires a width W of each road set with candidate points from the database (road data file 54) (S42). The information processing control device 20 then calculates the GPS cost based on the width W and the distance d from the GPS position for each candidate point (S43).

FIGS. 8A to 8C are explanatory drawings of the relationship between a GPS position G and the width W for a candidate point. In FIGS. 8A to 8C, a reliability circle has the GPS position G as its center and the speculative maximum error e (m) acquired at S41 as its radius. A width circle has a candidate point as its center and the width W (m) as its radius. Note that a width point w is defined as an intersection between the width circle and a line segment that links the GPS position G and the candidate point. As shown in FIG. 8B, d is the distance between the GPS position G and the candidate point, L1 is the distance between the GPS position G and the width point w (L1=d−W), and L2 is the distance from the width point w to the reliability circle (L2=L1−e=d−W−e).

The GPS cost shown in FIGS. 8A to 8C is determined as follows in accordance with the relationships between the GPS position G, the candidate point A, and the width W. FIG. 8A shows an example in which the distance d between the GPS position G and a candidate point A1 is equal to or smaller than the width W (d £ W). That is, FIG. 8A shows an example in which the GPS position G is inside the width circle. In this case, there is a high probability that the vehicle is near the candidate point A1, so the GPS cost is zero. In other words, a GPS cost is not added to the candidate point A1.

FIG. 8B shows an example in which the distance d is greater than the width W, and the distance d is equal to or less than the sum of the width W and the speculative maximum error e (L1−e≦0). That is, FIG. 8B shows an example in which the GPS position G is not inside the width circle and the width point w is inside the reliability circle. In this case, a GPS cost k1 proportional to the distance L1 between the GPS position G and the width point w is added to a candidate point A2. However, the proportionality constant is small because there is still a possibility that the vehicle exists within the range of the width W.

Specifically, the GPS cost k1 is calculated using equation (1) below.

$$k1 = L1 \times H1 \qquad (1)$$

Here, proportionality constant H1=Kd/speculative maximum error e. Kd is defined as the reliability circle boundary cost (a fixed value), and is the GPS cost k1 when the distance L1 equals the speculative maximum error e (the GPS cost k1 when the candidate point is located on the reliability circle).

FIG. 8C shows an example in which the distance d is greater than the width W, and the distance d is greater than the sum of the width W and the speculative maximum error e (L2=L1−e>0). That is, FIG. 8C shows an example in which the GPS position G is not inside the width circle and the width point w is also not inside the reliability circle. In this case, a GPS cost k2 proportional to the distance L2 from the width point w to the reliability circle is added to a candidate point A3. However, a proportionality constant H2 is larger than the proportionality constant H1 in the example of FIG. 8B because the GPS position G is so far away that the width point w is not inside the reliability circle.

Specifically, the GPS cost k2 is calculated using equation (2) below.

$$k2 = L2 \times H2 + Kd \qquad (2)$$

Here, proportionality constant H2>proportionality constant H1. Note that the GPS cost k2 is provided with an upper limit so that if L2 is equal to or greater than an upper limit distance Lm, the GPS cost k2 is calculated using equation (2) where L2=Lm.

Figure 9:
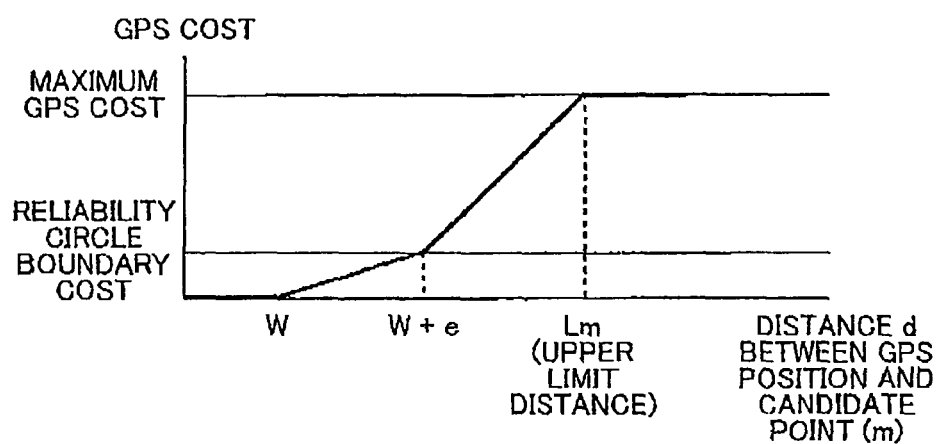
FIG. 9 is an explanatory drawing that shows a GPS cost value with respect to a distance d between a GPS position and a candidate point.

FIG. 9 shows a GPS cost value with respect to the distance d between a GPS position and a candidate point. As shown in FIG. 9, the GPS cost is zero until the distance d equals the width W. The GPS cost k1 increases at a small slope in accordance with the distance L1 from the width W to the width W plus the speculative maximum error e (W+e). The GPS cost k2 increases at a large slope in accordance with the distance L2 from the width W plus the speculative maximum error e (W+e) to the upper limit distance Lm. Once the distance d is greater than the upper limit Lm, the GPS cost is a uniform maximum cost.

Note that if the vehicle travels only a distance dr (m) after GPS reception, the width W in equations (1) and (2) may be converted into a width W' to calculate the GPS costs k1 and k2. The converted width W' is calculated from the actual width W and the distance dr using equation (3) below.

$$W' = \sqrt{(d \times d + W \times W)} \qquad (3)$$

After the GPS cost is calculated for each candidate point using the relationship between the width W and the distance d between the GPS position and each candidate point as described above (S43), the information processing control device 20 returns to the main routine in FIG. 6 and performs a cost calculation for each candidate point (S5). In other words, the information processing control device 20 calculates the cost of each candidate point with respect to the estimated position P1 of the vehicle found at S2. This cost calculation calculates the normal cost with respect to the estimated position P1 and then adds the GPS cost if the GPS cost is calculated (S4). It should be noted that regarding the GPS cost for each candidate point, the GPS cost calculated in each map matching process over a predetermined distance after passing a branch point is cumulatively added. Therefore, the GPS cost (or the accumulated GPS cost) at the respective estimated positions P calculated for the candidate points is saved in the RAM 24.

The normal cost calculation concept is described below. Candidate points with smaller values for both the distance difference and heading difference from the estimated position P can be considered more likely to be the best candidate point. Using a travel state such as vehicle speed, the probability of the vehicle traveling on an expressway is considered high if the vehicle is traveling at a high speed (e.g. 100 km/h). With regard to the past state, the probability of the vehicle traveling on a general (high speed) road is considered high if the vehicle was traveling a general (high speed) road in the near past. Half the normal cost at the previous candidate point is used as the past candidate point state. Points are assigned to each of the above states (the values of the distance difference and heading difference are used as points), and the total value thereof is calculated as the normal cost of each candidate point.

For example, at a candidate point X set on a general road with the vehicle traveling at a speed of 100 km/h, the distance difference is 5 meters, the heading difference is 5 degrees, the travel state is 10 (because the probability of the vehicle traveling 100 km/h on a general road is low), and the previous normal cost is 50. In this case, the normal cost total for the candidate point X is 5+5+10+(50×1/2)=45. Meanwhile, at a candidate point Y set on an expressway, the distance difference is 10 meters, the heading difference is 3 degrees, the travel state is 0 (because the probability of the vehicle traveling 100 km/h on an expressway is high), and the previous normal cost is 40. In this case, the normal cost total for the candidate point Y is 10+3+0+(40×1/2)=33.

The above calculation example illustrates an approach to the normal cost, and the most suitable actual coefficients and addition method are used.

After calculating the cost for each candidate point (normal cost+GPS cost), the information processing control device 20 determines the candidate point with the smallest cost as the leading candidate point and sets the vehicle position to the leading candidate point (S6). The information processing control device 20 then returns to the main routine.

FIG. 10 shows the relationship between a cost (normal cost+GPS cost) for each candidate point and a leading candidate point when correctly matched to a road after a narrow angle branching. As shown in FIG. 10, the following effects are obtained by the present example. Note that regarding the costs for the candidate points shown in FIG. 10, the first number is the normal cost at that point while the second and subsequent numbers are the cumulatively added GPS costs.

(a) The cost is calculated in consideration of an error (speculative maximum error e) of the GPS position G depending on the GPS reliability, so wrong GPS cost additions can be kept to a minimum.

(b) The GPS costs at each candidate point after passing a branch point are cumulatively added to the normal cost at each point. Therefore, the overall cost does not drastically change with temporary deviations in the GPS position G. False matching and hunting are thus not likely to occur.

(c) Performing a cost calculation that considers GPS reliability ensures the addition of a large GPS cost k2 when the GPS accuracy is high because the speculative maximum error e decreases and the distance L2 increases, thus facilitating recovery from false matching.

Map matching that considers the width W and GPS reliability according to the present example and uses a cost calculation was explained above. In this example, if the position accuracy in the forward-backward direction of each candidate point is somewhat high and the candidate points do not greatly deviate before and after in the advancing direction, different GPS costs that correspond to the distance from the GPS position are cumulatively added to the candidate points. It is thus easier to recover from a false match and harder to not make a correct match. However, if the position accuracy in the forward-backward direction of each candidate point is somewhat poor and the candidate points greatly deviate before and after in the advancing direction, the upper limit value (maximum GPS cost) is added to all the candidate points. Therefore, adding the GPS cost has no effect.

Figure 11A:
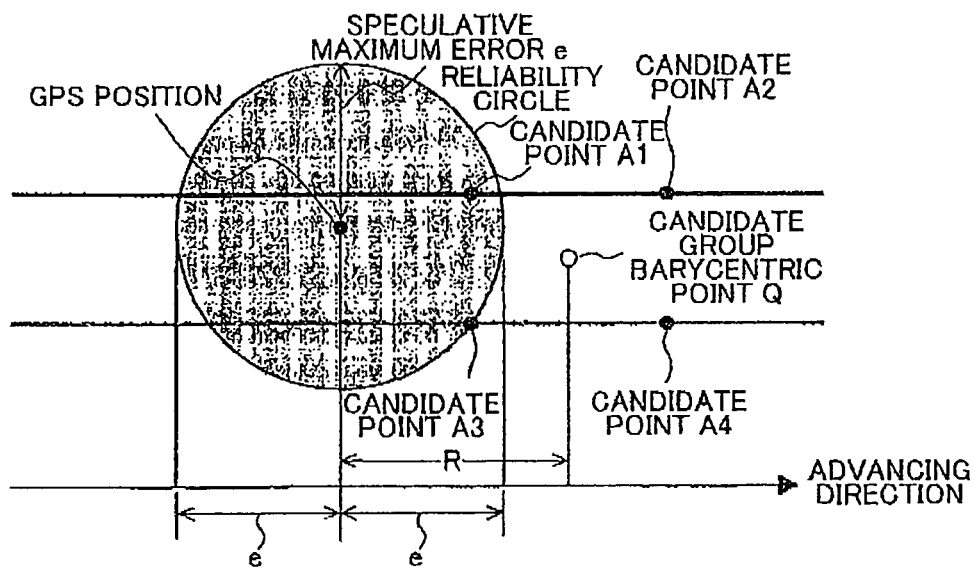
FIGS. 11A and 11B are explanatory drawings that outline a correction corresponding to a forward-backward displacement in the advancing direction of candidate points.
Figure 11B:
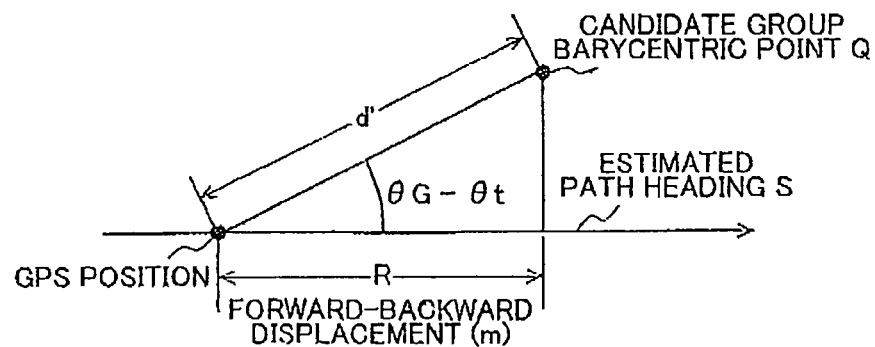

A modification of the present example will be explained that, if the candidate points greatly deviate before and after in the advancing direction, corrects and advances the positions of the candidate points in order to gradually increase accuracy in the forward-backward direction. FIGS. 11A and 11B are explanatory drawings that outline a correction corresponding to a forward-backward displacement in the advancing direction of candidate points. As shown in FIG. 11, a plurality of candidate points A1 to An is set on an n number of roads. In the example shown in the figure, four candidate points A1 to A4 are set on two roads. As this figure shows, a plurality of candidate points may be set on the same road. For example, if a new road is included within a predetermined distance from the estimated position P and the new road bends, two perpendicular lines may extend from the estimated position P, or two roads set with candidate points may merge.

The information processing control device 20 calculates a barycentric point Q for this group of candidate points. That is, an arithmetic average of the coordinate values of each candidate point is set as the coordinate value of the barycentric point Q. If the barycentric point Q is further ahead of or behind the GPS position than the range of the speculative maximum error e, the movement amount is corrected in the processing at S2, which moves the candidate points. Namely, as shown in FIG. 11B, the information processing control device 20 calculates a displacement R in the forward-backward direction (displacement in the direction of a heading S of the estimated path) of the barycentric point Q with respect to the GPS position using equation (4) below. The information processing control device 20 then makes a correction if the displacement R is greater than the speculative maximum error e.

$$R = d' \times \cos(\theta g - \theta t) \quad (4)$$

In equation (4), d' is the distance (in meters) from the barycentric point Q of the group of candidate points to the GPS position G, qt is the heading of the estimated path (in degrees), and qg is the heading of the GPS position G as viewed from the barycenter of the group of candidate points (in degrees).

Corrections are made gradually at the timing to update candidates, with the candidate points advanced by an extra predetermined distance t (e.g., 1 m) more than normal if the barycentric point Q is behind the GPS position, and held back by the predetermined distance t more than normal if the barycentric point Q is ahead of the GPS position.

Figure 12:
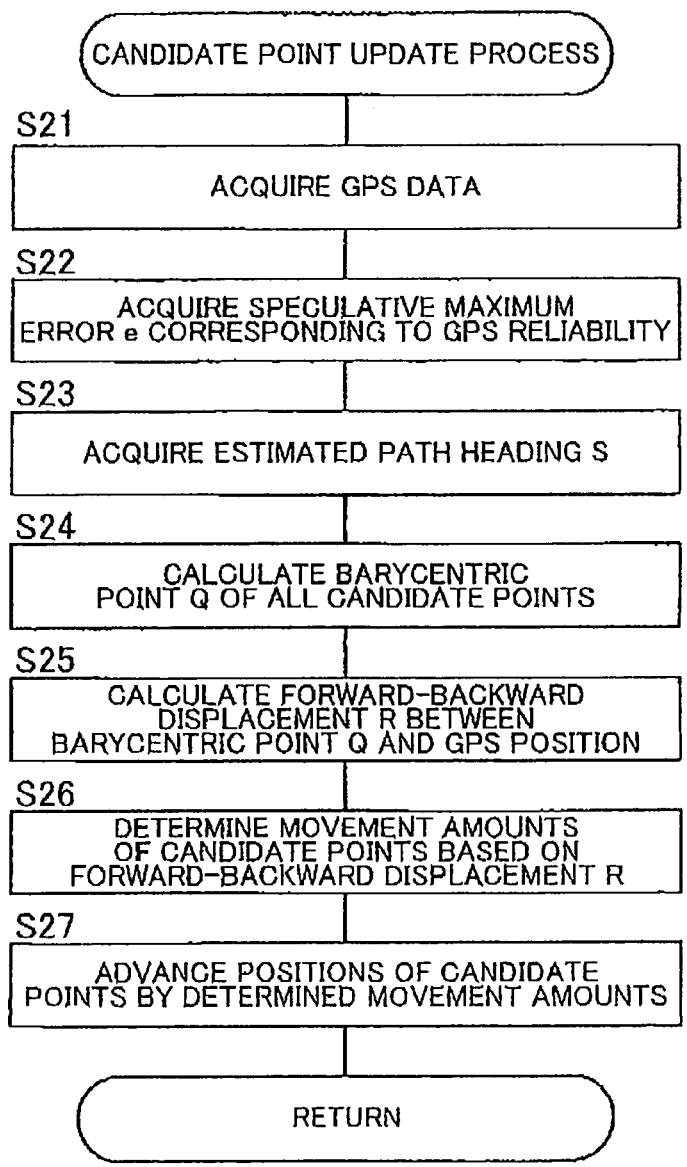
FIG. 12 is a flowchart that shows the content of a candidate point update process that executes a forward-backward direction correction process.

FIG. 12 is a flowchart that shows an algorithm of the content of a candidate point update process that executes a forward-backward correction process according to the present modification at S2. The information processing control device 20 acquires GPS data (S21), and acquires the speculative maximum error e that corresponds to the GPS reliability as described at S40 (S22). The speculative maximum error e acquired at S22 in the present modification is stored in the RAM 24, and the speculative maximum error e is read out and acquired from the RAM 24 at S41.

The information processing control device 20 next acquires the heading S of the estimated path (S23). That is, the heading S from the current estimated position is acquired using the previous estimated position found by dead reckoning navigation as a reference.

The information processing control device 20 subsequently acquires the barycentric point Q of all the candidate points in the group (S24). Specifically, with the movement distance of the vehicle that uses the previous estimated position P0 as a reference serving as a normal movement amount, the candidate points are each moved in the advancing direction along the road and the barycentric point Q is calculated from the coordinates of each candidate point post-movement.

The information processing control device 20 then calculates the forward-backward displacement R between the calculated barycentric point Q and the GPS position (S25), and determines the movement amount of each candidate point (S26). Namely, the information processing control device 20 sets the movement amount equal to the normal movement amount minus 1 (m) if the displacement R is ahead of the barycentric point Q and greater than the speculative maximum error e. If the displacement R is equal to or less than the speculative maximum error e, the movement amount is set equal to the normal movement amount (m). If the displacement R is behind the barycentric point Q and greater than the speculative maximum error e, the information processing control device 20 sets the movement amount equal to the normal movement amount plus 1 (m).

The information processing control device 20 next moves the positions of the candidate points in the advancing direction on the respective roads by amounts corresponding to the respective movement amounts determined at S26 (S27), and returns to the main routine.

In the description of the modification above, the barycentric point Q is found for the next candidate points and a determination is made as to whether the displacement R is equal to or less than the speculative maximum error e. However, a barycentric point Q' for the candidate points corresponding to the previous estimated position P0 (candidate points before movement) may be found, and a correction performed when moving the current candidate points based upon whether a displacement R' with the previous GPS position is equal to or less than the speculative maximum error e.

An example and a modification of the navigation device and navigation program according to the present invention was described above, but the present invention is not limited to the example and examples described above, and may be subjected to various further modifications within the scope of the claims. For example, in the example and modification described above, the speculative maximum error e serving as the radius of the reliability circle is determined based on the GPS reliability. However, an error circle based on the DOP of the GPS may be used. The speculative maximum error in such case is used as the radius of the error circle.

In addition, it is not necessary to use the radius of the error circle when calculating the GPS cost. For the GPS cost in this case, a value L1 is found by subtracting the width W of the road set with a candidate point from the distance d between the GPS position and the candidate point. The GPS cost is then calculated so as to increase as the value L1 increases. Note that in such case, the GPS cost of the candidate point may be set to zero if subtracting the width W from the distance d results in a negative number.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation device that identifies a leading candidate point by calculating a cost for candidate points that are set on a road, and matches a vehicle position to the identified leading candidate point, the navigation device comprising:
    a controller that:
        acquires an estimated position of a vehicle based on dead reckoning navigation;
        acquires a GPS position of the vehicle based on GPS;
        sets the candidate points for the vehicle position on roads in the vicinity of the estimated position;
        calculates for each candidate point a normal cost of the candidate point with respect to the estimated position;
        calculates for each candidate point a correction cost that corresponds to a value L1, the value L1 being found by subtracting a width W of the road from a distance d between the GPS position and the candidate point; and
        identifies the leading candidate point based on a total cost of the normal cost and the correction cost for each candidate point.

2. The navigation device according to claim 1, wherein the controller:
    sets the correction cost to zero if the value L1 is negative.

3. The navigation device according to claim 1, wherein the controller:
    acquires a speculative maximum error e that specifies a distance of an error range with respect to the GPS position;
    calculates a value L2 by subtracting the speculative maximum error e from the value L1;
    if the value L2 is negative, sets the correction cost as a value equal to the value L1 multiplied by a first proportionality constant; and
    if the value L2 is positive, sets the correction cost as a value equal to the sum of:
        the value L2 multiplied by a second proportionality constant larger than the first proportionality constant; and
        the speculative maximum error e multiplied by the first proportionality constant.

4. The navigation device according to claim 3, wherein:
    the speculative maximum error e is a radius of an error circle that is based on a dilution of precision of the GPS.

5. The navigation device according to claim 3, wherein:
    the speculative maximum error e is a distance that corresponds to a reliability calculated from:
        a dilution of precision;
        a distance between the estimated position and the GPS position; and
        a difference between a heading according to a trajectory of the estimated position and a heading according to a trajectory of the GPS position.

6. A navigation method that identifies a leading candidate point by calculating a cost for candidate points that are set on a road, and matches a vehicle position to the identified leading candidate point, the navigation method comprising:

acquiring, with a controller, an estimated position of a vehicle based on dead reckoning navigation;

acquiring, with the controller, a GPS position of the vehicle based on GPS;

setting, with the controller, the candidate points for the vehicle position on roads in the vicinity of the estimated position;

calculating, with the controller, for each candidate point a normal cost of the candidate point with respect to the estimated position;

calculating, with the controller, for each candidate point a correction cost that corresponds to a value L1, the value L1 being found by subtracting a width W of the road from a distance d between the GPS position and the candidate point; and identifying, with the controller, the leading candidate point based on a total cost of the normal cost and the correction cost for each candidate point.

7. The navigation method according to claim 6, further comprising:

setting the correction cost to zero if the value L1 is negative.

8. The navigation device according to claim 6, further comprising:

acquiring, with the controller, a speculative maximum error e that specifies a distance of an error range with respect to the GPS position;

calculating, with the controller, a value L2 by subtracting the speculative maximum error e from the value L1;

if the value L2 is negative, setting the correction cost as a value equal to the value L1 multiplied by a first proportionality constant; and if the value L2 is positive, setting the correction cost as a value equal to the sum of:
the value L2 multiplied by a second proportionality constant larger than the first proportionality constant; and
the speculative maximum error e multiplied by the first proportionality constant.

9. The navigation method according to claim 8, wherein:
the speculative maximum error e is a radius of an error circle that is based on a dilution of precision of the GPS.

10. The navigation method according to claim 8, wherein:
the speculative maximum error e is a distance that corresponds to a reliability calculated from:
a dilution of precision;
a distance between the estimated position and the GPS position; and
a difference between a heading according to a trajectory of the estimated position and a heading according to a trajectory of the GPS position.

11. A non-transitory computer-readable storage medium storing a computer-executable program usable to identify a leading candidate point by calculating a cost for candidate points that are set on a road, and matches a vehicle position to the identified leading candidate point, the program comprising:

instructions for acquiring an estimated position of a vehicle based on dead reckoning navigation;

instructions for acquiring a GPS position of the vehicle based on GPS;

instructions for setting the candidate points for the vehicle position on roads in the vicinity of the estimated position;

instructions for calculating for each candidate point a normal cost of the candidate point with respect to the estimated position;

instructions for calculating for each candidate point a correction cost that corresponds to a value L1, the value L1 being found by subtracting a width W of the road from a distance d between the GPS position and the candidate point; and instructions for identifying the leading candidate point based on a total cost of the normal cost and the correction cost for each candidate point.

12. The non-transitory computer-readable storage medium according to claim 11, the program further comprising:

instructions for setting the correction cost to zero if the value L1 is negative.

13. The non-transitory computer-readable storage medium according to claim 11, the program further comprising:

instructions for acquiring a speculative maximum error e that specifies a distance of an error range with respect to the GPS position;

instructions for calculating a value L2 by subtracting the speculative maximum error e from the value L1;

instructions for, if the value L2 is negative, setting the correction cost as a value equal to the value L1 multiplied by a first proportionality constant; and instructions for, if the value L2 is positive, setting the correction cost as a value equal to the sum of:
the value L2 multiplied by a second proportionality constant larger than the first proportionality constant; and
the speculative maximum error e multiplied by the first proportionality constant.

14. The non-transitory computer-readable storage medium according to claim 13, wherein:
the speculative maximum error e is a radius of an error circle that is based on a dilution of precision of the GPS.

15. The non-transitory computer-readable storage medium according to claim 13, wherein:
the speculative maximum error e is a distance that corresponds to a reliability calculated from:
a dilution of precision;
a distance between the estimated position and the GPS position; and
a difference between a heading according to a trajectory of the estimated position and a heading according to a trajectory of the GPS position.

* * * * *